J. Judson,
Governor.

No 33,743.   Patented Nov. 19, 1861.

Witnesses.
J. Fraser
S. J. Allen

Inventor
Junius Judson

UNITED STATES PATENT OFFICE.

JUNIUS JUDSON, OF ROCHESTER, NEW YORK.

IMPROVEMENT IN GOVERNORS FOR STEAM-ENGINES.

Specification forming part of Letters Patent No. 33,743, dated November 19, 1861.

*To all whom it may concern:*

Be it known that I, JUNIUS JUDSON, of Rochester, in the county of Monroe and State of New York, have invented a new and useful Improvement in the Governors of Steam-Engines; and I do hereby declare that the following is a full and exact description thereof, reference being had to the accompanying drawings, making part of this specification, in which—

Figure 3:
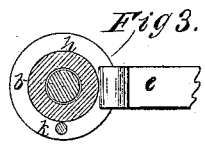
Figure 2:
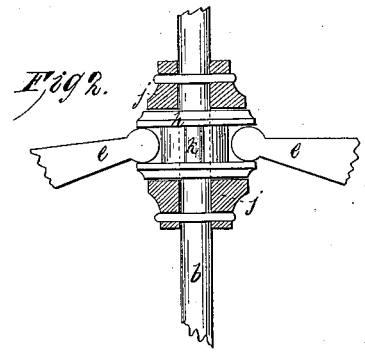
Figure 4:
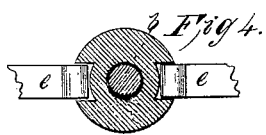
Figure 1:
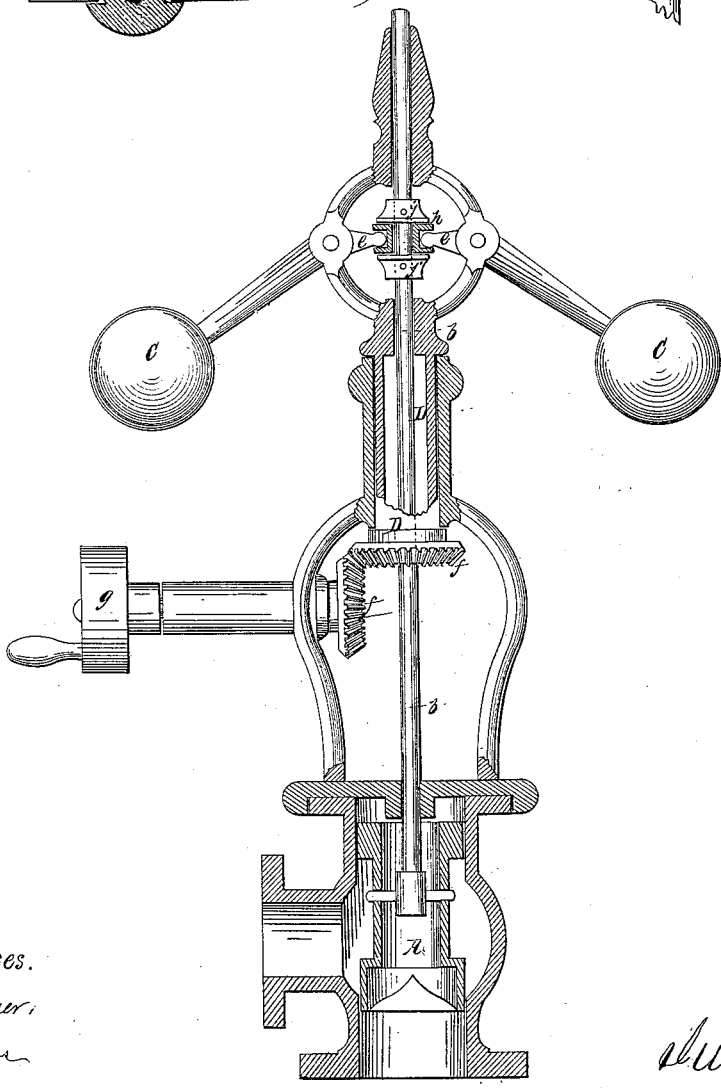

Figure 1 is an elevation of a governor constructed after my improved method, parts thereof being shown in section. Fig. 2 is an enlarged view of a portion of the valve-rod $b$, swivel-collar $h$, and parts of the arms $e$, the stationary collar $j\,j$ being shown in section. Fig. 3 is a horizontal section of the collar through the groove for the arms $e$, a portion of one being shown. Fig. 4 represents a modification in the construction of the collar, which is made solid with mortises for the reception of the arms.

Like letters designate corresponding parts in all the figures.

My improvement consists in connecting the arms of the fly-balls directly with a stationary rod from the valve by means of a swivel-collar, by which much friction is saved and the construction greatly simplified and cost reduced.

As represented in the drawings, my improvement is shown attached to a balanced piston-valve, but it is equally well adapted to any other form of governor-valves.

A is the valve, $b$ the rod or spindle therefrom connecting it with the governor-balls C C. The rod passes through the hollow shaft D, which has at its lower extremity a miter-gear $f$, which connects with a corresponding pinion on the shaft of the band-pulley $g$ from which rotary motion is imparted to the balls.

I provide a loose or swivel collar $h$ upon the rod $b$, having an annular groove in its periphery which receives the ends of the arms $e\,e$ of the governor-balls, which are made of a circular form at their termination, in order to turn easily in the groove as the balls rise or fall under the influence of their motion. A stationary or clutch collar $j$ is placed above and below the swivel-collar $h$ and held by pins or other fastenings securely to the rod. This insures to the rod the only motion that is required to work the valve A—that is, the rising and falling of the same in obedience to the action of the governor-balls—while the collar, the medium for communicating that action, revolves on the rod with the balls. From the small extent of its surface subject to friction—namely, that in contact with the rod and the stationary collars—the loss from that cause and from the wearing of the parts is very trifling, while all jointed connections of the rod are dispensed with and the cost of construction very much reduced. A pin $k$ is placed across the groove in the collar $h$ to prevent its remaining stationary on the rod and thus cause an increase of friction, or the collar may be made solid, with recesses for the arms $e\,e$, as shown in Fig. 4.

What I claim as my invention, and desire to secure by Letters Patent, is—

The swivel-collar $h$, revolving freely on the rod $b$ between the fixed collars $j\,j$ or their equivalents, so as to receive and turn with the ends of the governor-arms $e\,e$, and thereby obviate excessive friction and destructive wear, substantially as herein specified.

JUNIUS JUDSON.

Witnesses:
   J. FRASER,
   S. J. ALLIS.